S. H. & D. W. Davis.

Fish Freezing Apparatus

112129

Patented Feb 28 1871

Attest
Frederick Eberts
M. Stewart

Inventors.
Samuel H. Davis
David W. Davis,
per Attorney
Thos. S. Sprague

United States Patent Office.

SAMUEL H. DAVIS AND DAVID W. DAVIS, OF DETROIT, MICHIGAN.

Letters Patent No. 112,129, dated February 28, 1871.

IMPROVEMENT IN PRESERVING FISH BY FREEZING.

The Schedule referred to in these Letters Patent and making part of the same.

*To whom it may concern:*

Be it known that we, SAMUEL H. DAVIS and DAVID W. DAVIS, of Detroit, in the county of Wayne and State of Michigan, have invented a new and useful Improvement in Freezing-Sacks; and we do delare that the following is a true and accurate description thereof, reference being had to the accompanying drawing and to the letters of reference marked thereon and being a part of this specification, in which—

Figure 1:
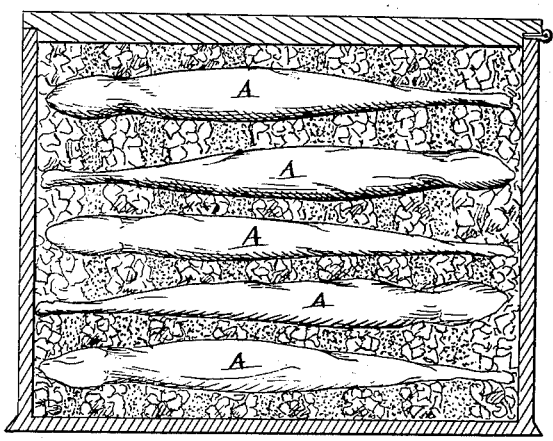
Figure 2:

A freezing-box is shown in section, containing our fish-inclosing sacks, in Figure 1; and Figure 2 shows a detached sack, containing a fish.

The object of this invention is to provide a covering or envelope for containing fresh fish while being subjected to the action of a freezing mixture; and It consists in the employment of sacks of thin sheet-rubber or other water-proof material, for that purpose.

In freezing fish for preservation, if a fish be placed in a mixture of broken ice or salt it will speedily be frozen; but on removal and exposure to the atmosphere, the salt or brine absorbed in and adhering to it will soon thaw and spoil the fish.

To overcome this difficulty boxes or pans of sheet metal for inclosing the fish have been used, which pans were placed in the freezing-mixture, the sides of the contained fish being in contact with the top and bottom sections of the pan, the parts of the metal which are in contact with the fish acting as conductors of the cold thereto. A limited area of the surface of the fish being exposed to the action of the freezing-compound, the process is necessarily slow and proportionately expensive in the consumption of the freezing material.

By our method the entire surface of the fish is exposed to the action of the freezing-mixture, hence our process is much more rapid and economical than that described.

In the drawing—

A represents sacks of thin and seamless sheet-rubber, in each of which a fresh fish is inserted, and the mouth of the sack tightly closed so that no moisture can enter.

In a suitable box a layer of pounded or ground ice and common salt is deposited, and on this a layer of sacks containing fresh fish, over which is spread another layer of the freezing-mixture, which causes the sacks to conform to the shape of the fish inclosed and bring the freezing-material in close contact with every part.

In about one hour the fish will be frozen solid, when the sacks should be removed from the freezing-material and dipped in water, which removes any adhering salt and thaws it enough to permit the fish to be withdrawn.

Preference is given to the employment of sheet-rubber as a material from which to make the sacks, but any other water-proof material may be used.

If desired, the process may be carried on without making up the fabric into sacks by using it in large sheets inclosing layers of fish, care being taken to prevent the entrance of the mixture at the edges of the sheets.

What we claim as our invention, and desire to secure by Letters Patent, is—

Thin water-proof sacks, or their equivalents, for containing fresh fish and animal matter, and subjected to the process of freezing, substantially as herein described.

SAMUEL H. DAVIS.
DAVID W. DAVIS.

Witnesses:
FREDERICK EBERTS,
M. STEWART.